United States Patent
Champion et al.

(10) Patent No.: US 7,567,795 B1
(45) Date of Patent: Jul. 28, 2009

(54) SYSTEMS AND METHODS FOR RESTRICTING THE USE OF STOLEN DEVICES ON A WIRELESS NETWORK

(75) Inventors: Laurenn L. Champion, Marietta, GA (US); John Scott Daniel, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 646 days.

(21) Appl. No.: 11/264,647

(22) Filed: Oct. 31, 2005

(51) Int. Cl.
*H04M 1/66* (2006.01)

(52) U.S. Cl. .................... 455/410; 455/411; 455/414.1; 455/418; 455/558; 455/428

(58) Field of Classification Search ......... 455/410–411, 455/403, 414.1, 422.1, 428, 432.2, 432.3, 455/433, 435.1, 445, 558, 560, 550.1–553.1, 455/415, 418–420; 705/26; 235/385; 340/5.92, 340/5.65; 380/247–248; 379/114.14, 127.02, 379/145, 185, 189, 191
See application file for complete search history.

(56) References Cited

U.S. PATENT DOCUMENTS

| | | | | |
|---|---|---|---|---|
| 5,903,830 A | * | 5/1999 | Joao et al. ................... | 455/406 |
| 5,933,776 A | * | 8/1999 | Kirkpatrick ................. | 455/423 |
| 6,038,440 A | * | 3/2000 | Wu ............................ | 455/410 |
| 6,259,907 B1 | * | 7/2001 | Bellamy et al. ............. | 455/410 |
| 6,590,967 B1 | * | 7/2003 | Marchand et al. ...... | 379/114.14 |
| 2003/0100290 A1 | * | 5/2003 | McGregor et al. .......... | 455/410 |
| 2003/0119485 A1 | * | 6/2003 | Ogasawara ................. | 455/411 |
| 2003/0135417 A1 | * | 7/2003 | Bodin ........................ | 705/16 |
| 2003/0216969 A1 | * | 11/2003 | Bauer et al. .................. | 705/22 |
| 2005/0107068 A1 | * | 5/2005 | Smith et al. ................ | 455/409 |
| 2006/0009214 A1 | * | 1/2006 | Cardina et al. ........... | 455/432.3 |
| 2007/0287417 A1 | * | 12/2007 | Abramovich ............... | 455/410 |

* cited by examiner

*Primary Examiner*—Kamran Afshar
(74) *Attorney, Agent, or Firm*—Parks Knowiton LLC; Paul Knowiton, Esq.; Adam J. Citrin, Esq.

(57) ABSTRACT

A system and method for controlling wireless network access for stolen wireless devices is disclosed. The system creates an electronic record for devices intended for sale in retail stores. The records associated with the devices include a field that identifies the devices as unsold prior to being shipped to those stores. Upon proper purchase, the retail store automatically communicates to the wireless service provider that a device has been sold. The system updates the electronic record to show that the device has been purchased. Sold devices are allowed to access the network as normal. Attempts to use a device marked as unsold result in the call being routed to a fraud management center for verification of proper device purchase.

16 Claims, 5 Drawing Sheets

Fig_2

FIG. 3

SYSTEMS AND METHODS FOR RESTRICTING THE USE OF STOLEN DEVICES ON A WIRELESS NETWORK

FIELD OF THE INVENTION

This invention relates generally to the field of wireless services and restrictions on the use of stolen devices on a wireless network.

BACKGROUND

Wireless telephone service has gained widespread acceptance and popularity throughout much of the modern world. Advanced technologies on the horizon will speed the delivery of data to and from mobile devices as well as make voice calls more reliable, further increasing the desirability of having access to wireless services. Many individuals are deciding to discontinue landline service altogether, relying solely on wireless service for telephone voice communications.

To meet the public demand for wireless access, wireless service providers have developed a myriad of service plans. These service plans, though, generally fall into one of two categories, postpaid or prepaid. Postpaid access plans allow the mobile customer to use airtime during a period and be billed for it at a later date. Enrollment in such a plan can require a level of trust between the customer and the wireless service provider, who may, for example require a credit check to determine if the customer has a history of promptly paying his or her debts. Generally, devices are sold under these plans at a discounted rate, the discount being recouped over the term of a contract that the customer is required to enter. The contract binds the customer to purchase wireless service for a predetermined period of time. Such plans also generally charge a base rate for a certain number of included minutes of airtime and/or amounts of data that can be transferred. An increased rate is usually charged for additional minutes or data.

Prepaid plans, on the other hand, allow the customer to pay for the wireless service before it is used. This can allow customers who might have some negative credit history to receive wireless access without risk to the wireless service provider that the bill will go unpaid. Additionally, prepaid plans can be attractive to customers who do not wish to enter into a long term contract commitment. Such plans can also be used by those who want to avoid the risk of expending their allotment of base minutes and paying the increased rate thereafter.

Of course, before a customer can enroll in an access plan, the customer must own a wireless device. These devices can include cell phones, PDAs, and Blackberry™ handheld devices, among others. Newer devices are not only popular due to their wireless convenience, but have also for novelty and fashion purposes. Modern devices allow customers to download ring tones, video games, and purchase accessories and upgrades.

Wireless devices can be found for sale in a myriad of locations: mall kiosks, stores operated by wireless service providers, national office and computer supply stores, and other large national retailers. These locations may offer one or both of prepaid and postpaid plans with the devices that are offered for sale. The devices offered at these locations may be locked to a specific wireless service provider and may also be restricted under agreement between the reseller and the wireless service provider as to whether or not they can be activated as a postpaid or prepaid device.

Unfortunately, the popularity of wireless access has made wireless devices a tempting target for theft. By stealing a device, the thief avoids paying the upfront cost for the device itself and can call the wireless service provider to activate service for the device. Contract commitments are avoided as well. The thief might have difficulty activating the phone as a postpaid device due to credit history problems, but might still obtain prepaid service. Where postpaid phones are generally stored under a counter or locked away in a cabinet with only a sample phone on display, prepaid phones are often placed in boxes in customer accessible areas. This can make them more susceptible to theft by customers or even store employees.

Not knowing that a new device has been stolen, the wireless provider can unwittingly allow the stolen device to access the network.

Some wireless architectures include provisions for combating theft. For example, the Global System for Mobile Communications (GSM) standard defines a unique device identifier for all compliant phones. This identifier is called an International Mobile Equipment Identifier (IMEI). GSM service providers can maintain a database of IMEIs that categorizes the status of the IMEI. For example, three status levels can be used, white, black, and gray. A white listed device could be a device that has no suspicious activity associated with it. A gray listed device could have some history of suspicious activity but still be allowed to access the network, and a black listed device could be a known stolen or rogue device. Wireless service providers may or may not limit device access in this manner.

The IMEI can be used, for example, when a paying customer's device is stolen from a car. The customer can call the GSM provider to report the stolen phone, and the GSM provider can blacklist the phone so that it is unable to access the network. The IMEI is known in this case, because it was associated with the customer's account. GSM providers may share their IMEI lists so that a blacklisted phone cannot be used on any network and is thereby rendered useless. Some European wireless service providers limit access in this manner.

This method of restricting stolen device usage is effective in the scenario presented above, but does not prove as helpful in the case of a new device being stolen from a retail store's shelves. In this case the retailer may not have the IMEI on record. Or, the retailer may not notice that the device has been stolen for quite some time, allowing the thief to use it in the interim. It is also possible that the retailer does not have the resources to devote to informing the wireless service provider that the device has been stolen. For example, it might cost more to pay staff members to watch inventories closely enough to detect the theft, determine which device was stolen and its IMEI, and then call the wireless service provider to blacklist the device. Even more troublesome for retailers, is the case where the staff members themselves are stealing the devices. Some retailers, indeed, may decide that due to the risk of theft, it is not worth offering the devices for sale at all. This is an unfortunate situation for the wireless service provider, the retailer, and honest paying customers.

What is needed is a reliable, convenient, and efficient way to identify new devices that have been stolen from retail stores and restrict their use on a wireless network.

SUMMARY OF THE INVENTION

The various embodiments of the present invention overcome the shortcomings of the prior art by providing systems and methods for restricting the use of a stolen wireless device on a wireless network.

In one embodiment, the system includes a device management system for storing a purchase indicator with a unique device identifier in computer readable memory. The device management system can be configured to receive the unique device identifier from a warehouse management system. The device management system can be further configured to receive an updated purchase indicator from a retail inventory system. If a device attempting to use the wireless network has a purchase indicator that shows that the device has not been sold, the system routes calls made by the device to a fraud management center.

An embodiment of a method according to the invention includes capturing a transmitted device identifier from a wireless device attempting to access a wireless network, comparing the captured device identifier to a list of identifiers stored in memory to find a purchase indicator for the device, and routing the device to a fraud management center if the purchase indicator shows that the device has not been purchased.

Another embodiment of a method according to the present invention includes capturing a unique device identifier and a unique subscriber identifier from a wireless device attempting to access the network, comparing the captured device identifier with a device identifier stored with a subscriber identifier matching the captured subscriber identifier, and if there is no match, comparing the captured device identifier to a list of identifiers stored in memory to find a purchase indicator for the device, and routing the device to a fraud management center if the purchase indicator shows that the device has not been purchased.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION

As required, detailed embodiments of the present invention are disclosed herein. It will be understood that the disclosed embodiments are merely examples to illustrate aspects of the invention that may be embodied in various and alternative forms. The figures are not necessarily to scale, and some features may be exaggerated or minimized to show details of particular components. In other instances, well-known materials or methods have not been described in detail to avoid obscuring the present invention. Therefore, specific structural and functional details disclosed herein are not to be interpreted as limiting, but as a basis for the claims and for teaching one skilled in the art to variously employ the present invention.

Referring now to the drawings in which like numerals indicate like elements throughout the several views, the drawings illustrate certain of the various aspects of exemplary embodiments of the invented system and method.

Figure 1:
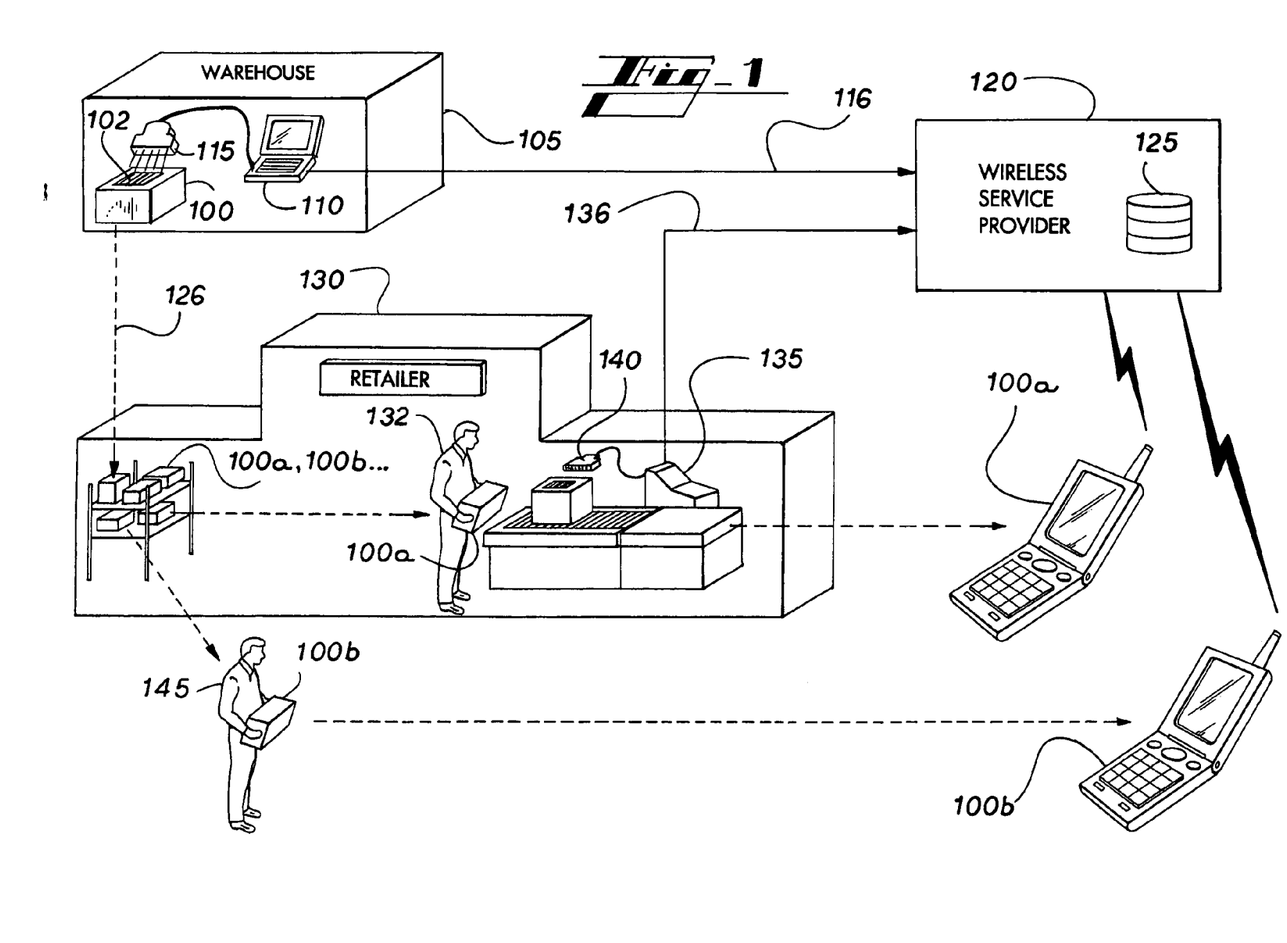
FIG. 1 is a diagram showing an exemplary environment for implementing systems and methods of the invention.

An overview of the invented systems and methods is depicted in FIG. 1. A wireless device, or in the embodiment depicted, a phone in a box (PIAB) 100 is shown located at a warehouse 105. The warehouse 105 can be a warehouse maintained by the wireless service provider, a manufacturer of wireless devices, a shipping company, or any other party that can store and ship wireless devices to resellers.

A computer system 110 is located at the warehouse 105 which includes an electronic reader 115 for reading the label 102 on the box 100. This electronic reader is shown as a barcode scanner, but it should be understood that the electronic reader can be a radio frequency identification (RFID) tag reader, or any other reader capable of scanning or interrogating a tag or label on the box 100. Likewise the barcode 102 shown on the box can be any type of electronically readable tag or label. The barcode scanner 115 reads the barcode on the box 100 and returns the information read to the computer system 110.

The information included on the barcode 102 can include details regarding the phone, including the manufacturer, model number, date of manufacture, and place of manufacture. The information can also include a unique device identifier. This identifier can also be printed on the device itself and stored in computer readable memory inside the device.

For purposes of illustration, the Global System for Mobile Communications (GSM) standard device identifier, International Mobile Equipment Identifier (IMEI), will be used throughout the following discussion. However, one skilled in the art will understand that other unique device identifiers can be used such as an Electronic Serial Number (ESN), a Medium Access Control (MAC) Address, a Mobile Equipment Identity (MEID), or any other device identifier known in the art.

The warehouse computer 110 communicates with the wireless service provider 120. The communication 116, includes the IMEI of the PIAB 100. The message sent can be formatted as an email, a text file, a Structured Query Language (SQL) database statement, SS7 signal, or any other wireless or wired format used for electronic communications. This communication can occur as the barcode 102 on the PIAB 100 is scanned, occur at timed intervals throughout a day, occur once a day in a nightly download, for example, or at any other interval. The communication can be initiated by the computer 110 or the wireless service provider 120.

The IMEI transferred to the wireless service provider 120 is then stored in a database 125 where it is marked as corresponding to a device that has not been sold to the end user. The wireless service provider 120 can make this designation based on the origin of the information (i.e., a warehouse). Alternatively, the communication from the warehouse could include this designation, for example, in a comma delimited text file that includes values that correspond to fields in a database table, or in an SQL statement such as an INSERT statement.

The PIAB is then shipped to the retailer 130, as indicated by dashed line 126. The retailer 130 can be any reseller of the wireless devices. The retailer places the PIAB 100 on display for sale. The display can include a number of PIABs 100a, 100b, etc. Such a display can advertise the phones as prepaid phones (user pays for wireless service upfront) or postpaid (user periodically pays for wireless service after airtime has been used). At this point, each of the phones on display has an IMEI that is marked as unsold in the database 125.

The customer 132 picks up a PIAB 100a and proceeds to the checkout counter to purchase the device. At checkout, the barcode 102 on the PIAB 100a is scanned by the retailer's point of sale computer 135 using the electronic reader 140. As mentioned previously with regard to the electronic reader 115, the electronic reader 140 can be any type of reader known in the art. The customer 132 pays for the PIAB 100a. The retailer point of sale computer 135 communicates with the wireless service provider 120. The communication 136 includes the IMEI of the PIAB that was just purchased. The communication indicates that the PIAB has now been sold. The information can be sent in any of the methods noted above for sending communication 116. In this case, however, regarding the timing of the communication, it could be preferable to send the information at the time the phone is purchased since the customer may wish to activate the phone immediately. The database 125 is updated to reflect that the IMEI transferred to the wireless service provider 120 corresponds to a phone that has been sold.

The customer 132 leaves the store with the purchased phone 100a. Instead of purchasing a PIAB on display, a thief 145 absconds from the retailer 130 with PIAB 100b.

The customer 132 opens the box and removes the phone 100a. The phone is turned on and the customer attempts to activate the phone. Upon registering with the wireless network, the phone transmits its IMEI. The database 125 is then queried for that IMEI. The query returns a purchase identifier from the database indicating a sold status for the phone corresponding to that IMEI. The phone is activated on the network. When the customer 132 attempts to place a call, the phone call is routed as dialed.

The thief 145 opens the box containing the stolen phone 100b and attempts to activate the phone. Phone 100b sends its IMEI to the wireless service provider 120. The IMEI is captured by the wireless service provider. The database 125 is queried for that IMEI and the query returns a purchase identifier indicating a not sold status for the phone. When the thief attempts to place a call on the network, the call is not routed as dialed. The call can be routed, for example, to a wireless service provider fraud management center.

TABLE 1

| Location of device in commerce stream | Unique Device ID | Purchase Indicator |
| --- | --- | --- |
| At warehouse and before sale to end user. | 123456789012345 | NS |
| After sale to end user | 123456789012345 | S |

Table 1 above shows a data association between a purchase indicator and a unique device identifier. In this context, an association means a logical link or relationship created in computer memory, for example, in a record in a computer database. The first column represents the location of the device in the stream of commerce. The second column represents the unique device identifier and the third column shows a purchase indicator that indicates whether the device has been marked as sold by a reseller. This data can be stored as a record by the wireless service provider in a separate table having the unique device ID as its primary key. Alternatively, the purchase indicator can be stored in an existing table containing device, account, and/or subscriber information.

Some retailers, however, may not wish to participate in the stolen device restriction program due to cost and/or convenience issues regarding the program's implementation. Some may decide to risk having a thief leave their premises with an operational phone. If all phones shipped from the warehouse are marked NS and some non-participating retailers exist, then the device would not be updated at the point of sale. The purchaser would not be able to activate the phone.

Since all retailers may not wish to participate in the program, it can be preferable to associate additional data with the unique device identifier. This can provide consistency at the warehouse and give the wireless service provider additional options for tracking the sale of wireless devices.

TABLE 2

| Unique Device ID | Allowed Activation | Retailer Participation Type | Purchase Indicator | Active Status | Shipped to Code | Activated by Code | Activated As |
| --- | --- | --- | --- | --- | --- | --- | --- |
| 123456789012345 | PO—Prepaid Only AA—Any Activation | P—Participating NP—Non-Participating PP—Participating Postpaid | S—Sold NS—Not Sold | A—Active I—Inactive | Code Identifying Recipient of device | Code Identifying Activating Entity | Pre—Prepaid Activation Post—Postpaid Activation. |

Table 2 provides an example of a data format that can be used in this context. The unique device ID is associated in Table 2 with seven items of data: Allowed Activation, Retailer Participation Type, Purchase Indicator, Active Status, Shipped to Code, Activated by Code, and Activated As. The Allowed Activation Type can either be PO for prepaid only, or AA for any activation. This indicates the type of billing arrangement that the wireless service provider will allow for the associated device. The Retailer Participation Type can either be P for participating, NP for non-participating, or PP for participating postpaid. This field indicates whether or not the retailer that the phone is being shipped to participates in the stolen phone restriction program. As before, the Purchase Indicator can be S for sold, or NS for not sold. The Active Status indicates whether or not the phone as been activated on the wireless network for service. It can be A for active or I for inactive. The Shipped to Code is an identifier for the retailer intended to receive the device from the warehouse. The Activated By Code is used to indicate the entity that activated the device. After activation by the retailer, for example, this can be the same as the Shipped to Code. Another code can be used to indicate that an individual activated the phone by calling the wireless service provider. The Activated As field indicates the manner of billing that was set up at the time the phone was activated.

can set "allowed activation" to "PO" and "participation type" to "P". The "purchase indicator" will be set to "NS" and "active status" to "I".

The package scanner can then instruct a user through a package scanner display or other output device to scan the first item. The user can scan an item and the package scanner

TABLE 3

| Shipped Device Configuration | Allowed Activation | Participation Type | Purchase Indicator | Active Status | Shipped to Code | Activated by Code | Activated As |
|---|---|---|---|---|---|---|---|
| Participating Prepaid | PO | P | NS | I | ABC | — | — |

Table 3 shows initial values for a prepaid device to be shipped from the warehouse 105 according to the data format presented in Table 2. The allowed activation is prepaid only, the participation type is participating, and the purchase indicator is set to NS (not sold). The Active Status is initially set to I since the phone has not yet been activated. The Shipped to Code is listed as "ABC: which is meant to indicate an arbitrary retailer that participates in the stolen phone restriction program. The Activated by Code and Activated As fields are not populated since the device had not been activated.

Figure 2:
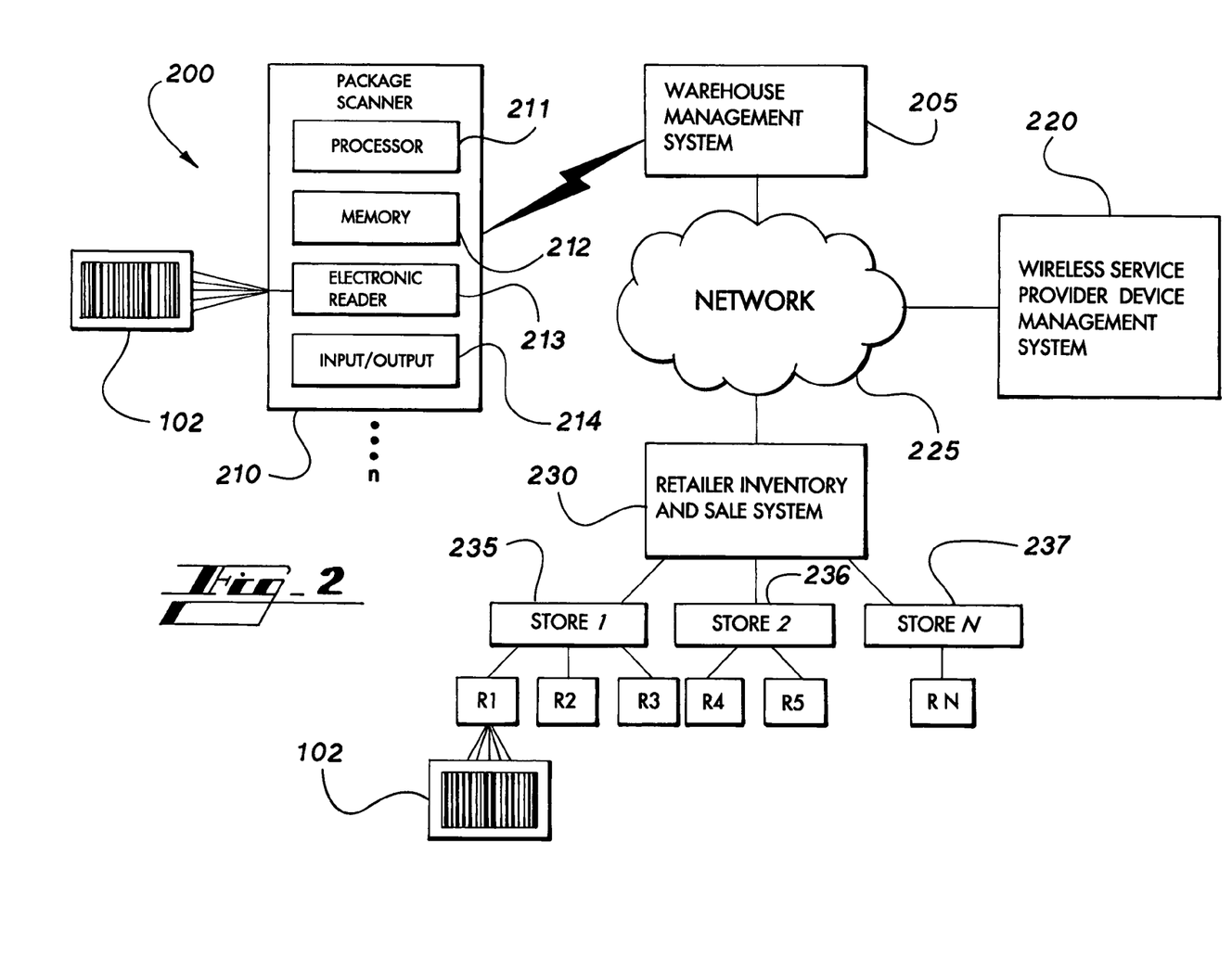
FIG. 2 is a block diagram showing a system for creating and updating a purchase indicator for wireless devices sold at a retail location.

FIG. 2 shows a system 200 for creating and updating a purchase indicator for wireless devices sold at a retail location. Warehouse management system 205 communicates with one or more package scanners 210. Each of these scanners can have a processor 211, a computer readable memory 212, an electronic reader 213 and an input/output system 214. The scanners can communicate wirelessly with the warehouse management system 205. Although a wireless embodiment is shown, the scanners 210 can be wired to the warehouse management system 205, and can use a processor and memory of the warehouse management system in lieu of being standalone units.

The electronic reader can be any type of reader capable of capturing data from a label or tag and providing this data to the processor 211 of the package scanner 210. Examples of such readers are optical readers than can scan data from barcodes and radio frequency identification tag readers. One of skill in the art will recognize that the use of other readers is within the scope of the present invention. The electronic reader 213 is used to read the label 102, shown as a barcode in this example, attached to a PIAB. The label contains a unique device identifier such as an IMEI. This information is provided to the processor 211.

The scanner can include a keyboard or other input device to allow a user to enter the destination of the PIAB where the device is to be shipped. The user can also enter parameters such as an allowed activation, and a participation type. Alternatively, the user can enter a shipped device configuration which will set the other values accordingly. A shipped to code can be entered which can have the values preset to meet a recipient's saved profile. The package scanner 210 can be used to capture data and set parameters for a single PIAB or a series of PIABs. For example, the package scanner can be set to scan thirty phones that are to be shipped to retailer ABC. The scanner can have a saved profile for retailer ABC (or such a profile can be downloaded from the warehouse management system 205). By choosing "ship to code" "ABC", the scanner can instruct the user to scan another item or press a button to indicate that no more packages with the current settings are to be scanned.

Data for the scanned PIABs can be stored in the memory 212 of the package scanner 210 and then transferred to the warehouse management system 205. The warehouse management system 205 can include a database for storing shipment information for shipments from the warehouse.

Either immediately, or through irregular or periodic updates initiated by either the warehouse management system 205 or the wireless service provider device management system 220, the unique device identifiers for the scanned PIABs and any associated information is transferred over the network 225 from the warehouse management system 205 to the device management system 220. The network 225 can be a private network or a public network such as the Internet. The device management system 220 can include a database where the PIAB information is stored.

The retailer inventory and sale system 230 can communicate over the same network 225 or another network (not shown) with the device management system 220. For a large retail chain that includes many stores, the inventory and sale system 230 can be connected to a plurality of stores 235, 236, 237. These stores can have registers R1-RN. Each register includes an electronic reader that is capable of reading the unique device identifier from a PIAB.

In the scenario of a proper purchase, a customer takes the device in its box to the checkout counter where is it is purchased at a register. The register reads the unique device identifier when the device is scanned and sends an electronic communication to the inventory and sale system 230. The inventory and sale system can then send an electronic message over the network 225 to the device management system 220 that includes the unique device identifier of the PIAB to indicate that the device has been sold. This communication preferably happens soon after the purchase as the customer may want to activate the phone immediately following the purchase. It should be understood that in some embodiments, the retail inventory and sale system 230 may be located at the same location as the register. The device management system 220 can update its database containing the unique device identifier (IMEI for the GSM example described above) to change the purchase indicator to from "NS" for "not sold" to "S" for "sold". The purchaser of the phone can activate the phone without being routed to a fraud management center once this has occurred. Once the phone is activated, the Active Status can be updated from inactive "I" to active "A".

In the case of a theft, the purchase indicator remains set to "NS" in the device management system.

In one embodiment of the present invention, the device management system 220 can receive a message from the warehouse management system 205 containing the unique device identifiers of PIABs that have no record of being shipped and have not recently appeared in an inventory update, for example, an inventory scan of all PIABs at the warehouse. The device management system can be configured to set the purchase indicator of these unique device identifiers to "NS". This embodiment can be used to deter theft at the warehouse.

Figure 3:
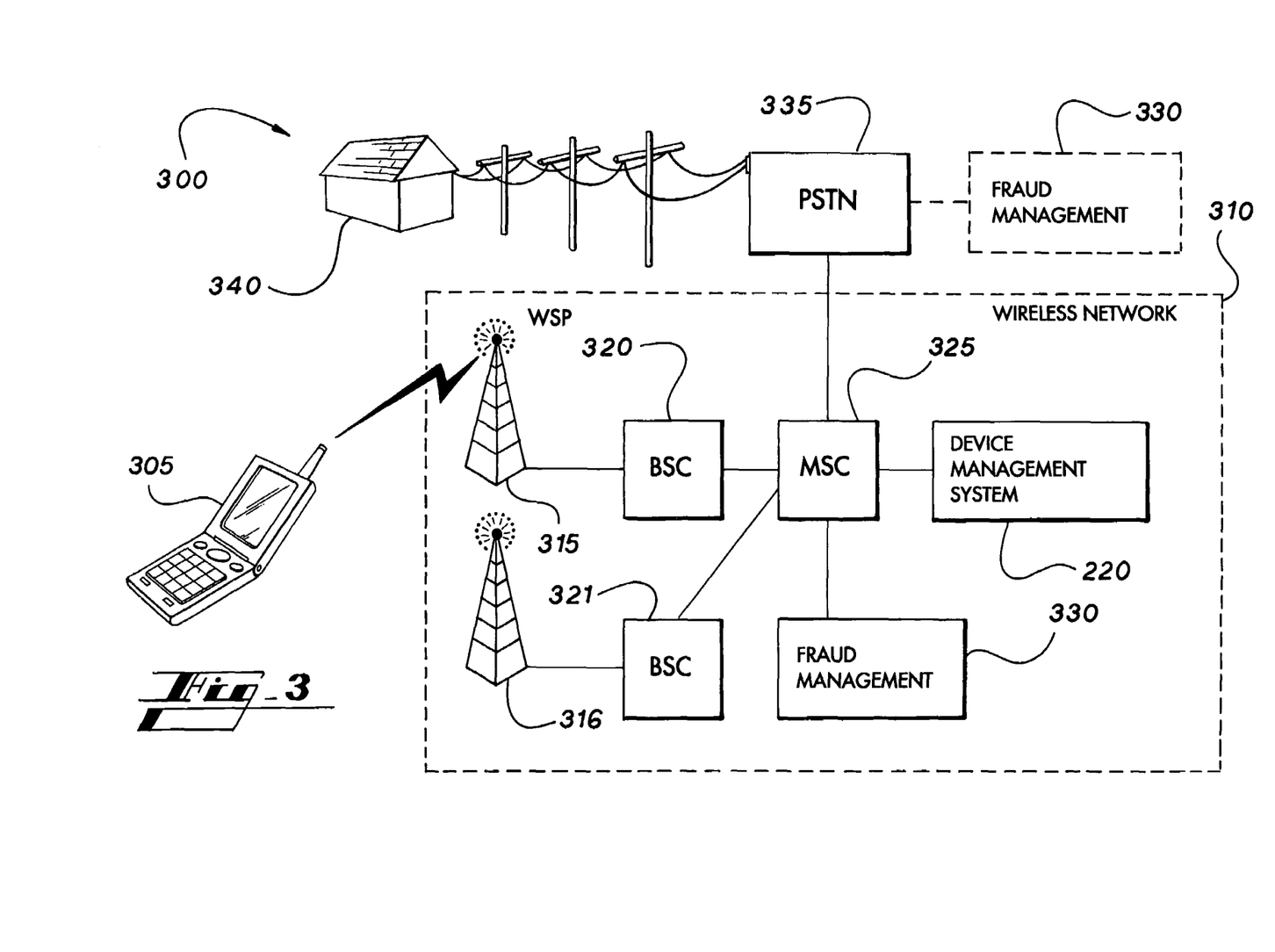
FIG. 3 is a block diagram showing a system for checking the purchase indicator of a device attempting to access the wireless network.

FIG. 3 shows a system 300 for checking the purchase indicator of a device attempting to access a wireless network. The wireless network 310 includes one or more base stations 315, 316 and one or more base station controllers (BSC) 320, 321 that are connected to or are otherwise in communication with a mobile switching center (MSC) 325. The MSC 325 is also connected to the public switched telephone network (PSTN) 335. The wireless network 310 includes a device management system 220 and can include a fraud management center 330 connected to the MSC 325. The fraud management center can alternatively be connected to the PSTN 335. House 340 having telephone access is connected to the PSTN 335.

The phone 305 attempts to place a call on the wireless network of the wireless service provider 310. In placing the call, the phone transmits its unique device identifier, among other data, to the base station 315. The BSC 320 captures the identifier and forwards it to the MSC 325. The MSC forwards the identifier to the device management system 220. The identifier can be passed, for example, in a call detail record (CDR). The device management system checks the purchase indicator to see of the device is marked as sold. If the device is marked as sold, the device management system 220 can instruct the MSC 325 to route the call as dialed, for example to the house 340 or to another wireless device on the wireless network 310.

If the purchase indicator corresponding to the unique device identifier shows that the device has not been sold, the device management system 220 can instruct the MSC to route the call to the fraud management center 330. Representatives in the fraud management center can inform the caller that the device is listed as unsold and request proof of purchase. If the caller is unable to provide proof of purchase by, for example, sending a copy of the receipt for the phone via facsimile, the caller is instructed to contact the place of purchase to resolve the issue. If the caller can provide proof of purchase, representatives in the fraud management center 330 can update the device management system 220 to change the purchase indicator for the unique device identifier associated with the phone 305 to "S" for sold or perform other operations in order to override the routing of the phone to the fraud prevention center in the future.

Figure 4:
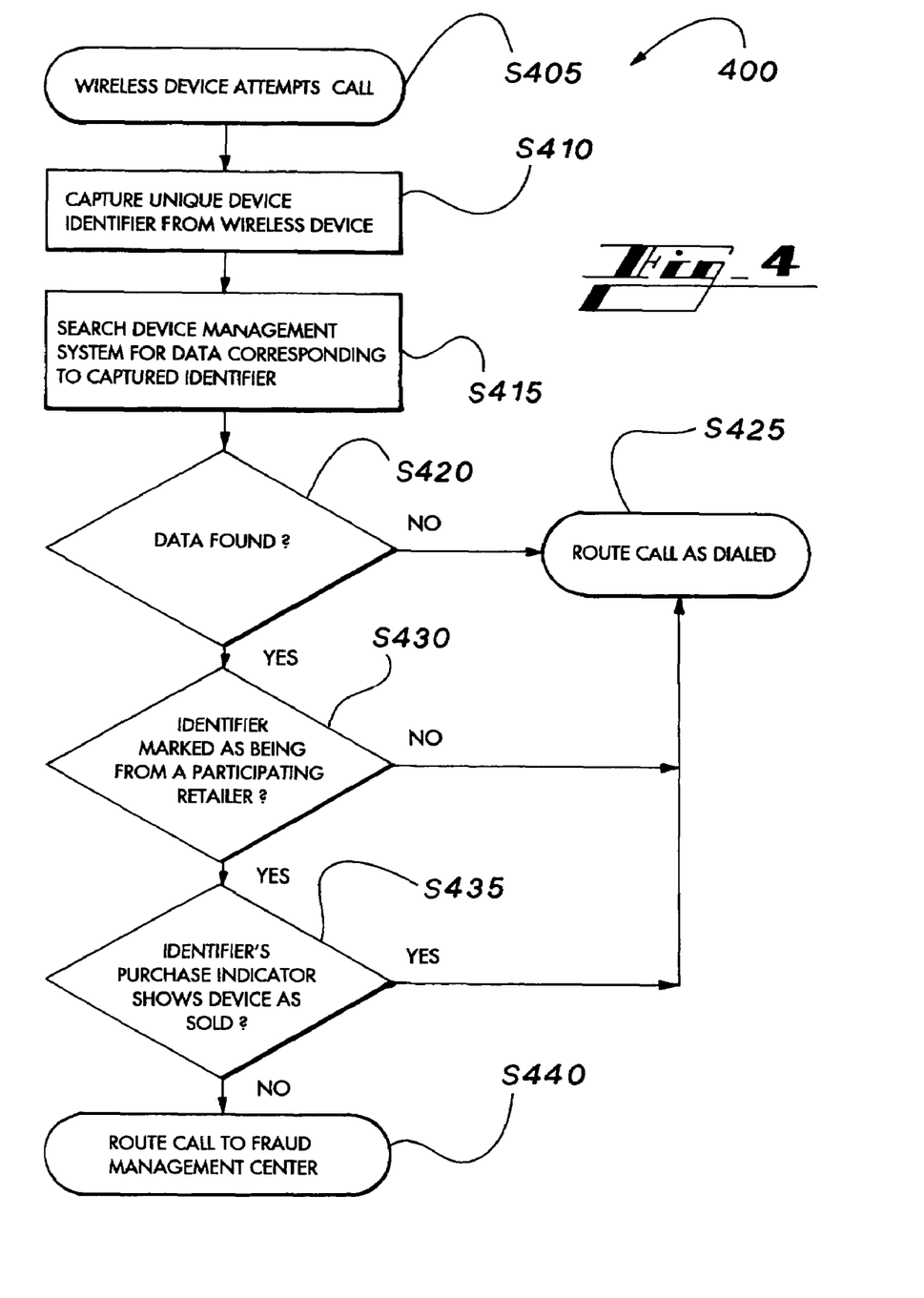
FIG. 4 is a flow chart depicting a method of detecting a stolen device attempting to access the wireless network according to the present invention.

FIG. 4 is a flowchart describing a method 400 of detecting a stolen device attempting to access the wireless network according to the present invention. The method begins at step S405 when a wireless device attempts to place a call on the wireless network. At S410 the unique device identifier is captured from the device attempting to place the call. At S415 the device management system is searched for a matching identifier. The outcome of decision block S420 depends on whether or not a matching identifier is found. If no matching identifier is found, the call is routed as dialed and the method ends at S425. If no identifier is found, the phone can be, for example, an older phone that was sold before the present invention was implemented. The call is routed as dialed so as not to interfere with the operation of these devices.

If the identifier is found in the device management system, operation continues to decision block S430 where the "participation type" field is checked to see if the device associated with the identifier is marked as having been shipped to a participating retailer. If not, then the call is routed as dialed and the method ends at S425. If the device is marked as having been shipped to a participating retailer the method continues to decision block S435.

At S435, the purchase indicator for the device associated with the unique device identifier is checked. If the purchase indicator shows that the device has been sold, the call is routed as dialed and the method ends at step S425. If the purchase indicator shows that the device has not been sold, the method ends at S440 where the call is routed to a fraud management center.

Figure 5:
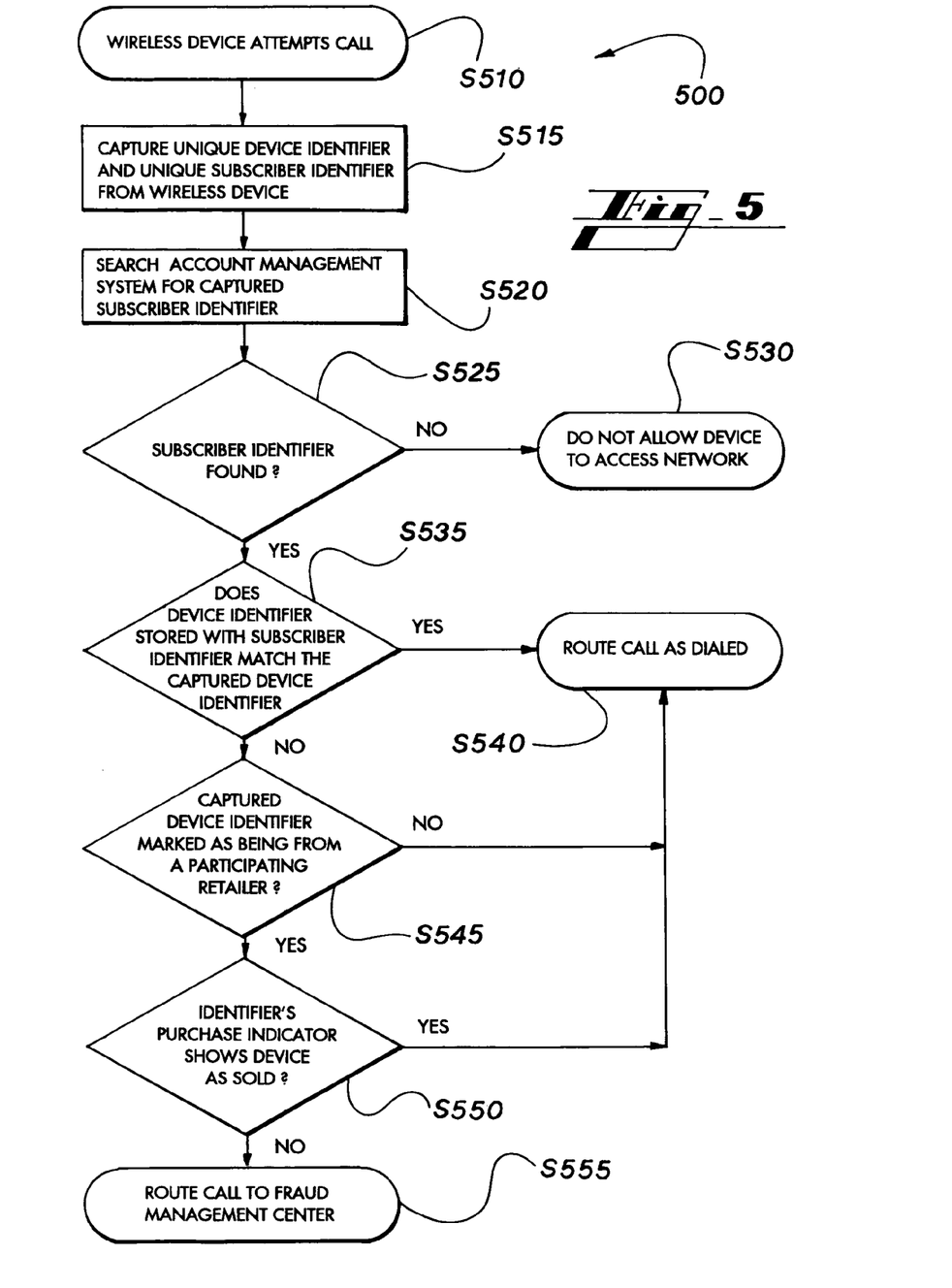
FIG. 5 is a flow chart depicting a method of detecting a stolen device where the stolen device is attempting to access the wireless network using a valid subscriber identifier.

FIG. 5 shows a method 500 of detecting a stolen device where the stolen device is attempting to access the wireless network using a valid subscriber identifier. In addition to a unique device identifier, wireless networks can also utilize a unique subscriber identifier. In the case of a GSM network, the unique subscriber identifier is located in a computer readable memory of a removable subscriber identity module (SIM) card inside of a phone. The SIM card contains the international mobile subscriber identifier (IMSI) which is used to associate a billing account with a wireless subscriber. A SIM card that is associated with an active wireless account can be removed from one phone and placed in another compatible phone. This allows a subscriber to place wireless calls to from the second phone that are billed to the account associated with the SIM card.

This functionality creates a situation where a current subscriber could use a stolen phone by simply removing the SIM card from an old phone and placing it into the stolen phone. The method 500 shown in FIG. 5 prevents a stolen phone from being used in this way. In this embodiment, an account management system is included in the wireless network that contains an association between a subscriber, an account, and a subscriber identification number (such as an IMSI located on the subscriber's SIM card). The account management system can also include an association between a subscriber identification number and a device identification number used by the subscriber. Alternatively, the device management system includes such an association.

The method begins at S510 where a wireless device attempts to place a call on a wireless network. The network captures a unique device identifier and a unique subscriber identifier from the wireless device at S515. At S520 the account management system is searched for the captured subscriber identifier. Operation proceeds to decision step S525. The outcome of decision step S525 depends on whether or not the subscriber identifier was located in the account management system. If the subscriber identifier was not found the device is not allowed to place the call, and the method stops at S530. For legacy devices that do not transmit a subscriber identity, the subscriber identity can be determined from account information as is known in the art. If no subscriber identifier is found in the account management system then no one can be billed for the call. The call is therefore not allowed. Alternatively, a phone placing such a call can be locked, or the call can be forwarded to a fraud management group, a recorded message, or be handled as otherwise known in the art.

If the subscriber identifier is found, processing continues to S535 where the account management system is queried to determine if the device identifier associated with the subscriber identifier in the account management system matches the device identifier captured from the wireless device attempting the call. Alternatively, the device management system can be checked for this information if the association is stored there. It should be understood that in some embodiments the account management system and the device management system may be integrated, for example, on the same server, or in the same database. If the device identifiers match, the call is routed as dialed and the method ends at S540.

If the two device identifiers do not match then processing continues to S545. If the identifiers do not match then it means that the subscriber is attempting to access the network using a phone other than the one previously used to place calls. At S545 the "participation type" field corresponding to the captured device identifier is checked in the device management system to see if the device is marked as having been shipped to a participating retailer. If it is not, then the method ends at S540 and the call is routed as dialed. If the device is marked as having been sold to a participating retailer, then processing continues to S550.

At S550, the purchase indicator for the device is checked to see if it is marked as sold or not sold. If the purchase indicator shows that the device has been sold, the method ends at S540 and the call is routed as dialed. If the purchase indicator shows that the device has not been sold, the call is routed to a fraud management center at S555.

The present invention has been illustrated in relation to a particular embodiment which is intended in all respects to be illustrative rather than restrictive. Those skilled in the art will recognize that the present invention is capable of many modifications and variations without departing from the scope of the invention.

Those skilled in the art will also appreciate that the system and methods described represent only examples of the various configurations that will be suitable for implementation of the various embodiments of the invention.

It must be emphasized that the law does not require and it is economically prohibitive to illustrate and teach every possible embodiment of the present claims. Hence, the above-described embodiments are merely exemplary illustrations of implementations set forth for a clear understanding of the principles of the invention. Many variations and modifications may be made to the above-described embodiments without departing from the scope of the claims. All such modifications, combinations, and variations are included herein by the scope of this disclosure and the following claims.

What is claimed is:

1. A system for restricting the use of a stolen wireless device on a wireless network, comprising:
   a wireless network device management system comprising a processor and a computer readable memory, the processor being configured to:
   receive a unique device identifier of the wireless device;
   store the device identifier in the computer readable memory with a purchase indicator;
   receive a device identifier from the wireless network corresponding to a device attempting to make a call, the calling device identifier being transmitted by the device to the network, captured by the network, and transferred to the device management system; and
   instruct the wireless network to route voice calls from the calling device to a fraud management center if the purchase indicator shows that the device has not been sold.

2. The system of claim 1, wherein
   the unique device identifier is received from a warehouse management system; and
   the purchase indicator is initially set to indicate that the device corresponding to the unique device identifier has not been sold.

3. The system of claim 1, wherein the processor is further configured to:
   receive an updated purchase indicator from a retail inventory system for the unique device identifier, the updated purchase indicator showing the device has been sold; and
   store the updated purchase indicator in the computer readable memory with the unique device identifier.

4. The system of claim 1, further comprising:
   a retail inventory system comprising a retail inventory processor and an electronic reader, wherein:
   the electronic reader is configured to electronically read a unique device identifier of the wireless device; and
   the retail inventory processor is programmed to receive the device identifier from the electronic reader and transmit the device identifier to the device management system along with an updated purchase indicator that shows the device as having been sold.

5. The system of claim 1, wherein the unique device identifier is an IMEI.

6. The system of claim 1, wherein the unique device identifier is an ESN.

7. The system of claim 1, wherein the unique device identifier is a MAC address.

8. The system of claim 1, wherein the unique device identifier is an MEID.

9. The system of claim 1, wherein the unique device identifier is an UMID.

10. A system for restricting the use of a stolen wireless device on a wireless network, comprising:
    a wireless network device management system comprising a processor and a computer readable memory, the processor being configured to receive a unique device identifier of the wireless device and store the device identifier in the computer readable memory with a purchase indicator;
    a warehouse management system comprising a warehouse management processor and an electronic reader, wherein:
    the electronic reader is configured to electronically read a unique device identifier of the wireless device;
    the warehouse management processor is programmed to receive the device identifier from the electronic reader and transmit the device identifier to the device management system; and
    the warehouse management system is configured to transmit the device identifier to the device management system, where the device identifier corresponds to a device that has no record of shipment in the warehouse management system and has not appeared in at least one inventory scan of the warehouse.

11. A method for routing calls in a wireless network comprising:
    capturing a unique device identifier and a unique subscriber identifier transmitted by a wireless device attempting to place a call using the wireless network;
    comparing the captured device identifier with a device identifier stored with a unique subscriber identifier matching the captured subscriber identifier in a computer readable memory,
    if the captured device identifier and the stored device identifier do not match:
    comparing the captured device identifier to a list of device identifiers stored in a computer readable memory;
    reading a purchase indicator stored with a matching device identifier from the list;

routing a call to a fraud management center if the purchase indicator shows that the device corresponding to the captured device identifier has not been sold.

12. The method of claim 11, wherein the unique device identifier is an IMEI and the unique subscriber identifier is an IMSI.

13. A package scanner for electronically marking a wireless device as not sold comprising:
- a processor;
- an electronic reader; and
- a computer readable memory, the electronic reader configured to read a unique device identifier of the wireless device and provide the unique device identifier to the processor, wherein the processor is configured to store:
  - the unique device identifier in the computer readable memory with a purchase indicator showing the device corresponding to the unique device identifier as not sold; and
  - a participation type indicator with the unique device identifier,
- wherein the participation type indicator indicates whether the intended shipping recipient of the device participates in a stolen device restriction program.

14. The package scanner of claim 13, wherein the processor is further configured to store a shipping destination code in the computer readable memory with the unique device identifier.

15. The package scanner of claim 13, wherein the processor is further configured to store a shipping destination in the computer readable memory with the unique device identifier.

16. A package scanner for electronically marking a wireless device as not sold comprising:
- a processor;
- a computer readable memory;
- an electronic reader configured to read a unique device identifier of the wireless device and provide the unique device identifier to the processor; and, wherein the processor is configured to store the unique device identifier in the computer readable memory with a purchase indicator showing the device corresponding to the unique device identifier as not sold, and, to store a participation type indicator and a shipping destination code with the unique device identifier, the processor automatically setting the participation type for the shipping recipient upon the entering of a shipping destination code.

* * * * *